(12) United States Patent
Oi (10) Patent No.: US 11,276,018 B2
(45) Date of Patent: Mar. 15, 2022

(54) MANAGEMENT SERVER

(71) Applicant: RISO KAGAKU CORPORATION, Tokyo (JP)

(72) Inventor: Yukihiro Oi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 48 days.

(21) Appl. No.: 16/353,528

(22) Filed: Mar. 14, 2019

(65) Prior Publication Data
US 2019/0287038 A1 Sep. 19, 2019

(30) Foreign Application Priority Data
Mar. 16, 2018 (JP) .............................. JP2018-048987

(51) Int. Cl.
G06Q 10/06 (2012.01)
G06Q 30/06 (2012.01)
(Continued)

(52) U.S. Cl.
CPC ... *G06Q 10/06315* (2013.01); *G03G 15/5079* (2013.01); *G03G 15/553* (2013.01);
(Continued)

(58) Field of Classification Search
None
See application file for complete search history.

(56) References Cited

U.S. PATENT DOCUMENTS 7,130,814 B1 * 10/2006 Szabo ................ G06Q 30/0201
705/26.8
2002/0002492 A1  1/2002 Okazawa
(Continued)

FOREIGN PATENT DOCUMENTS

DE   102012214294 A1   2/2013
JP      2002-32641 A    1/2002
(Continued)

OTHER PUBLICATIONS

Matsumoto, The Controllability of the Profit Structure of a Product: A Case Study of the Canon Inkjet Printer Business, 2007 (Year: 2007).*
(Continued)

*Primary Examiner* — Mohamed N El-Bathy
(74) *Attorney, Agent, or Firm* — Greenblum & Bernstein, P.L.C.

(57) ABSTRACT

A management server includes a printing-device management unit that receives consumables information indicating respective usage statuses of a plurality of consumables being used by a printing device from one or more printing devices, an order-timing estimating unit that calculates an estimated order timing at which each of the consumables is to be ordered based on a temporal variation in the usage statuses of each of the consumables, and a consumables-order planning unit that, when there are a plurality of estimated order timings within a predetermined period for one printing device, or when there are a plurality of estimated order timings within a predetermined period for a plurality of printing devices included in a certain neighboring area, changes and outputs a price of consumables associated with the estimated order timings corresponding to delivery statuses of the consumables.

5 Claims, 5 Drawing Sheets

(51) Int. Cl.
  *G03G 15/00* (2006.01)
  *G06K 15/00* (2006.01)
(52) U.S. Cl.
  CPC ....... *G06Q 30/0633* (2013.01); *G03G 15/556* (2013.01); *G06K 15/4075* (2013.01)

(56) References Cited

U.S. PATENT DOCUMENTS

| | | | |
|---|---|---|---|
| 2003/0110103 A1* | 6/2003 | Sesek | G06Q 10/087 705/28 |
| 2005/0074246 A1* | 4/2005 | Hayward | G06Q 30/0605 399/8 |
| 2008/0071605 A1* | 3/2008 | Asauchi | G06Q 10/30 705/308 |
| 2008/0193154 A1 | 8/2008 | Kamada | |
| 2011/0311243 A1* | 12/2011 | Kawai | G03G 21/1878 399/28 |
| 2012/0136741 A1* | 5/2012 | Agarwal | G06Q 10/00 705/26.1 |
| 2012/0148267 A1* | 6/2012 | Kawai | G03G 15/5079 399/8 |
| 2013/0038908 A1 | 2/2013 | Nagai | |
| 2016/0292774 A1* | 10/2016 | Ohara | G06F 3/1287 |
| 2018/0041647 A1* | 2/2018 | Sakamoto | G06F 3/121 |
| 2019/0251407 A1* | 8/2019 | Watanabe | B41J 2/1752 |

FOREIGN PATENT DOCUMENTS

| | | |
|---|---|---|
| JP | 2002-123140 | 4/2002 |
| JP | 2006-33000 A | 2/2006 |
| JP | 2008-21091 A | 1/2008 |
| JP | 2010-40054 A | 2/2010 |

OTHER PUBLICATIONS

Sep. 27, 2019 extended European Search Report in European Application No. 19162797.5.
Nov. 2, 2021 Japanese Office Action in corresponding Japanese Application No. 2018-048987 and translation thereof.

* cited by examiner

| MACHINE NUMBER | MODEL ID | TENANT ID | ESTIMATED ORDER TIMING ||||
|---|---|---|---|---|---|---|
| | | | K | C | M | Y | G |
| 12340001 | 101 | 1 | 2018/6/10 | 2018/3/10 | 2018/5/12 | 2018/3/30 | 2018/3/30 |
| 12340002 | 101 | 2 | 2018/3/1 | 2018/2/20 | 2018/5/10 | 2018/3/10 | 2018/4/10 |
| 12340003 | 101 | 2 | 2018/1/10 | 2017/12/25 | 2018/3/10 | 2018/3/30 | 2018/5/15 |
| 12340004 | 102 | 2 | 2017/12/20 | 2018/3/25 | 2018/5/15 | 2018/4/10 | 2018/4/10 |
| 12340005 | 103 | 3 | 2018/4/10 | 2018/7/20 | 2018/7/20 | 2018/7/10 | 2018/7/20 |

MANAGEMENT SERVER

BACKGROUND

1. Technical Field

The present invention relates to a technique of centralized order of consumables utilizing a management server.

2. Related Art

Many consumables are used in a printing device, and these consumables are replaced many times before the mechanical life of the printing device ends. Meanwhile, cost reduction is a long-term issue for many corporations, and the operational cost of the printing device is no exception. Therefore, for example, in Patent Literature 1 (Japanese Patent Application Publication No. 2002-032641), it is proposed to use a method of performing demand prediction of toner cartridges and discounting according to the number of purchases of the toner cartridges, thereby suppressing the order quantity of toner cartridges and reducing the operational cost of a printing device.

However, according to Patent Literature 1, because discount is made while focusing on the number of toner cartridges, if the order quantity is less, users cannot fully acquire the effect of cost reduction associated with the printing device.

Further, according to Patent Literature 1, although demand prediction of toner cartridges is performed, only the number of demands in each month is estimated (paragraph [0119], FIG. 8(b)), so that purchasing motivation of users with respect to the consumables of the printing device cannot be sufficiently increased, and thus sellers cannot promote the sales of consumables favorably.

Further, while an effect of enabling support for a bulk purchase plan taking its budget into consideration is described in Patent Literature 1 (paragraph [0171]), only discount menus are displayed in the embodiments in Patent Literature 1. That is, the determination whether to exceed the budget depends on user's judgment, and thus the budget cannot be taken into consideration in a practical manner. Therefore, users may place an order while exceeding the budget for consumables associated with the printing device.

The present invention has been made in view of the above problem. An object of the present invention is to provide an ordering method beneficial for both sellers who sell consumables of a printing device and users who purchase the consumables of the printing device.

SUMMARY

In order to achieve the above object, a management server according to the present invention comprises: a transmission and reception unit that communicates with one or more image forming devices; and a controller, wherein the controller receives consumables information indicating usage statuses of each of a plurality of consumables being used by the image forming device via the transmission and reception unit from the image forming device, calculates an estimated order timing at which each of the consumables is to be ordered, based on a temporal variation in the respective usage statuses of the consumables, and when there are a plurality of estimated order timings within a predetermined period for one image forming device, or when there are a plurality of estimated order timings within a predetermined period for a plurality of image forming devices included in a certain neighboring area, changes and outputs a price of consumables associated with the estimated order timings corresponding to delivery statuses of the consumables.

According to the present invention, it is possible to realize an ordering method beneficial for both sellers who sell consumables of a printing device and users who purchase the consumables of the printing device.

BRIEF DESCRIPTION OF DRAWINGS

The invention will now be described with reference to the accompanying drawings wherein.

DETAILED DESCRIPTION

An embodiment for carrying out the present invention will be described below with reference to the drawings. In the present embodiment, ink is used as an example of consumables consumed in a printing device.

<Configuration of Printing System>

Figure 1:
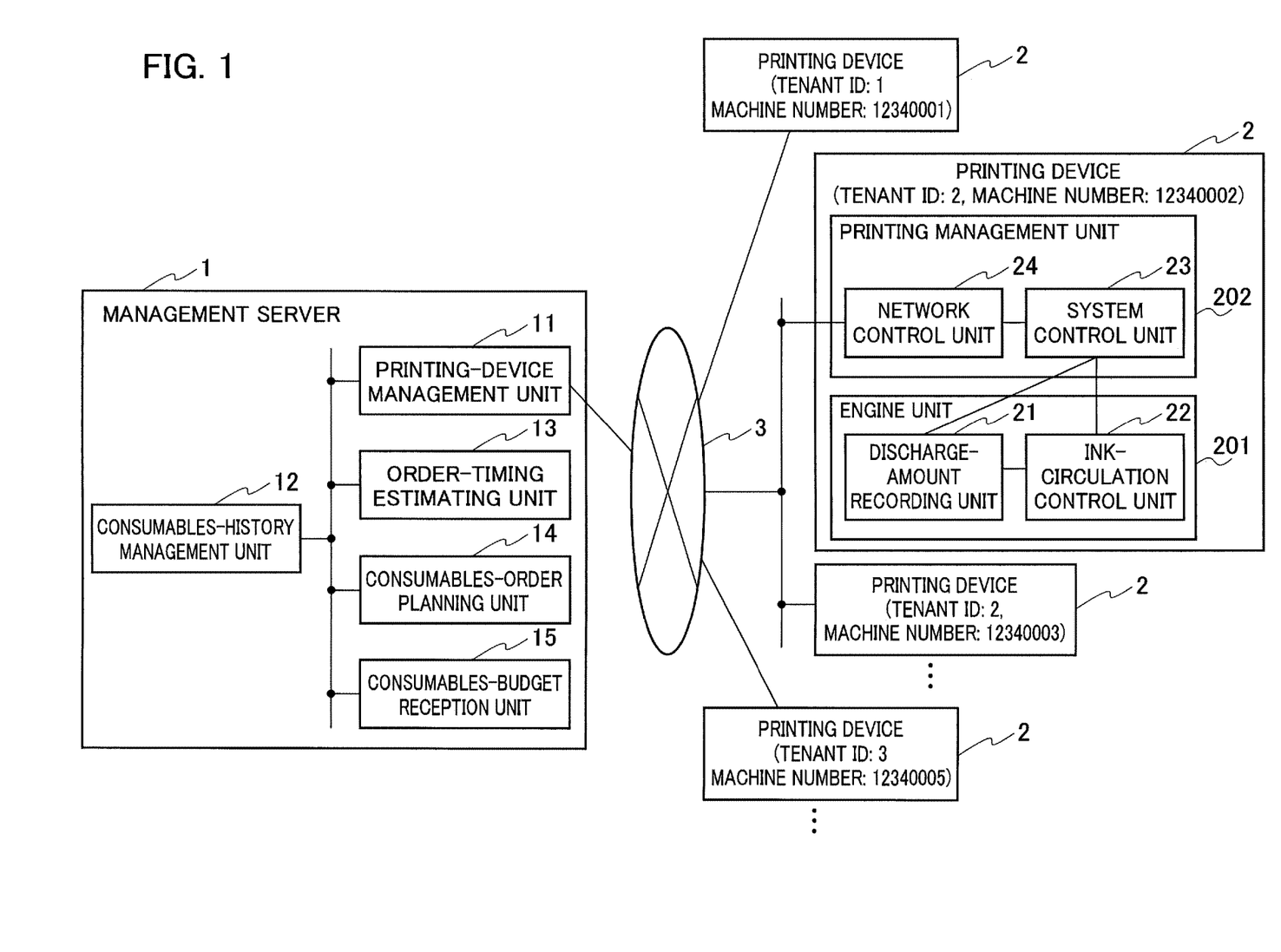
FIG. 1 is a diagram illustrating a configuration of a printing system.

FIG. 1 is a diagram illustrating a configuration of a printing system according to the present embodiment. The printing system is configured to include a management server 1 and a plurality of printing devices 2. The management server 1 and the printing devices 2 are connected to each other via a communication network 3 so as to be communicable with each other.

First, functions of the printing device 2 are described. The printing device 2 is a printer used by users such as corporations, government offices, and individuals. The printing device 2 includes, as illustrated in FIG. 1, an engine unit 201 that performs a printing process by consuming ink, and a printing management unit 202 that manages the printing process performed by the engine unit 201. The engine unit 201 includes a discharge-amount recording unit 21 and an ink-circulation control unit 22. The printing management unit 202 includes a system control unit 23 and a network control unit 24.

The discharge-amount recording unit 21 measures and records a discharge amount of ink (the number of drops or quantity of ink). Specifically, the discharge-amount recording unit 21 measures and records a discharge amount of ink drawn from an ink cartridge of each color ink set in the printing device 2 and discharged at the time of cleaning of a printing head and at the time of spraying ink to a printing medium, for the each color of ink. The printing medium is paper, cloth, CD, or DVD, for example.

The ink-circulation control unit 22 controls an ink circulation mechanism (not illustrated) to discharge ink at the time of cleaning of a printing head and at the time of spraying the ink to the printing medium. The ink circulation mechanism is a mechanism that draws ink from the ink cartridge through an ink replenishing tube by a negative pressure, and supplies the ink to the printing head through an ink circulation tube.

The system control unit 23 controls events and instructions generated in the printing device 2 according to the control state of the printing device 2. Specifically, the system control unit 23 reads out the ink discharge amount of each color ink from the discharge-amount recording unit 21 based on a control event or a control instruction of ink discharge from the ink-circulation control unit 22, and notifies the management server 1 of the read ink discharge amount as consumables information of the printing device 2.

The network control unit 24 transmits the consumables information of the printing device 2 to the management server 1 via the communication network 3, based on a transmission instruction of the consumables information from the system control unit 23.

Each of the printing devices 2 illustrated in FIG. 1 includes the functional units described above. Each of the printing devices 2 transmits consumables information in which the ink discharge amount is recorded to the management server 1, at the time of occurrence of an ink discharge control event, or at a regular timing or an arbitrary irregular timing.

The functions of the management server 1 are described next. The management server 1 calculates an estimated order timing of ink by collecting pieces of consumables information from the printing devices 2 respectively in chronological order, and proposes to users an ordering method to which discount due to a combined order is applied. The management server 1 includes, as illustrated in FIG. 1, a printing-device management unit 11, a consumables-history management unit 12, an order-timing estimating unit 13, a consumables-order planning unit 14, and a consumables-budget reception unit 15.

The management server 1 includes a transmission and reception unit (not illustrated) that performs communication with the communication network 3, and a controller (not illustrated). The transmission and reception unit performs communication with the printing device 2 via the communication network 3. The controller is a general-purpose microcomputer including a CPU (Central Processing Unit), a memory, and an input/output unit. A computer program for causing the controller to function as a management server is installed in the computer. By executing the computer program, the controller functions as a plurality of information processing circuits (11, 12, 13, 14, and 15) provided in the management server 1.

The printing-device management unit 11 identifies each of the printing devices 2 by using a tenant ID for identifying a user who uses the corresponding printing device 2 and a machine number for identifying a machine body of the corresponding printing device 2, and manages an operational status of the respective printing devices 2. Specifically, the printing-device management unit 11 receives consumables information, in which an ink discharge amount is recorded, from each of the printing devices 2 in chronological order via the communication network 3.

The consumables-history management unit 12 stores therein consumables information received from the respective printing devices 2 in chronological order for each of the printing devices 2. Because it suffices that the usage status of ink with passage of time is known, the consumables-history management unit 12 may store the consumables information to be associated with a reception time at an arbitrary position in a memory area instead of storing the information in chronological order.

The order-timing estimating unit 13 reads out the respective pieces of consumables information of the printing devices 2 from the consumables-history management unit 12 to analyze the temporal variation in the ink discharge amount of each color ink respectively, and then calculates an estimated order timing when each color ink is to be ordered respectively for each of the printing devices 2.

The consumables-order planning unit 14 respectively acquires the estimated order timing of each color ink in the respective printing devices 2 from the order-timing estimating unit 13. When there are a plurality of estimated order timings within a predetermined period for one printing device 2, or when there are a plurality of estimated order timings within a predetermined period for the plurality of printing devices 2 included in a certain neighboring area, the consumables-order planning unit 14 allows discount according to the number of elements of ink associated with the estimated order timings, calculates a changed price of a combined order according to the delivery status of the corresponding ink, and outputs the price as an applicable price within the predetermined period to a user terminal (not illustrated) or the printing device 2.

The consumables-order planning unit 14 also compares a calculated price of the combined order with a budget amount of consumables, and when the price of the combined order exceeds the budget amount of consumables, causes a user to select whether to prioritize the budget amount for suppressing the order within the budget or prioritize the order even if exceeding the budget amount. If the user selects to prioritize the budget amount, the consumables-order planning unit 14 outputs printing method information indicating a printing method for suppressing the use of ink to the user terminal or the printing device 2.

The consumables-budget reception unit 15 receives an input of a budget amount of a user associated with the ink of the printing device 2. The budget amount can be specified for each of users or each of the printing devices, and a unit of day, week, month, or year can be selected.

<Operations of Printing System>

Next, operations performed by the printing system are explained.

Figure 2:
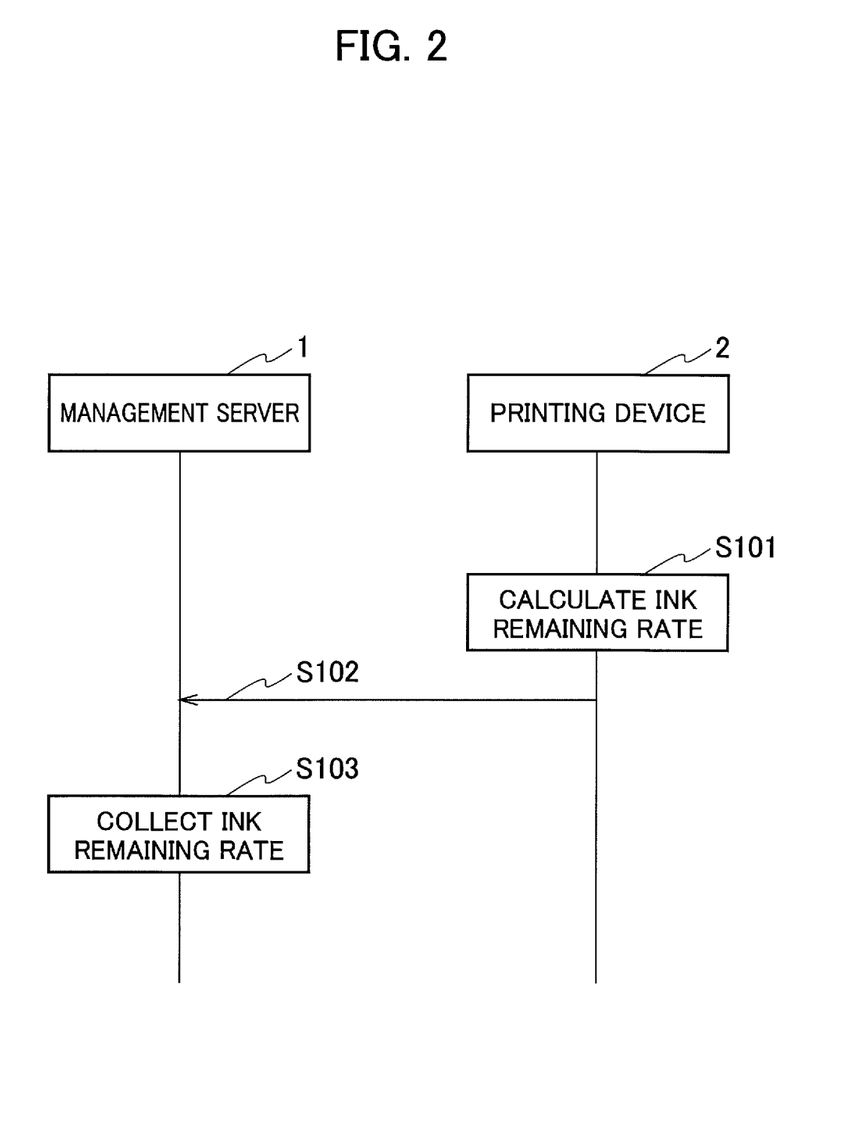
FIG. 2 is a diagram illustrating a process sequence for collecting consumables information.

An operation of the management server 1 for collecting consumables information of the printing device 2 is explained first. FIG. 2 is a diagram illustrating a process sequence for collecting consumables information.

Step S101;

First, after an ink discharge control event has been executed in the ink-circulation control unit 22, the system control unit 23 of the printing device 2 reads out the ink discharge amount of each color ink discharged based on the control event from the discharge-amount recording unit 21, and converts the ink discharge amount to an ink remaining rate.

Step S102;

Next, the network control unit 24 of the printing device 2 transmits the ink remaining rate of each color ink obtained at Step S101 to the management server 1 via the communication network 3, while adding a machine number of the printing device 2 thereto as the consumables information of the printing device 2.

Step S103;

Thereafter, the printing-device management unit 11 of the management server 1 receives the consumables information of the printing device 2, and the consumables-history management unit 12 stores therein the consumables information in association with a reception time.

Thereafter, the printing devices 2 repeatedly perform Step S101 to Step S103 every time the ink discharge control event is executed. The printing devices 2 may perform Step S101 to Step S103 at a regular or irregular timing, instead of performing these steps at the time of the ink discharge control event.

Figure 3:
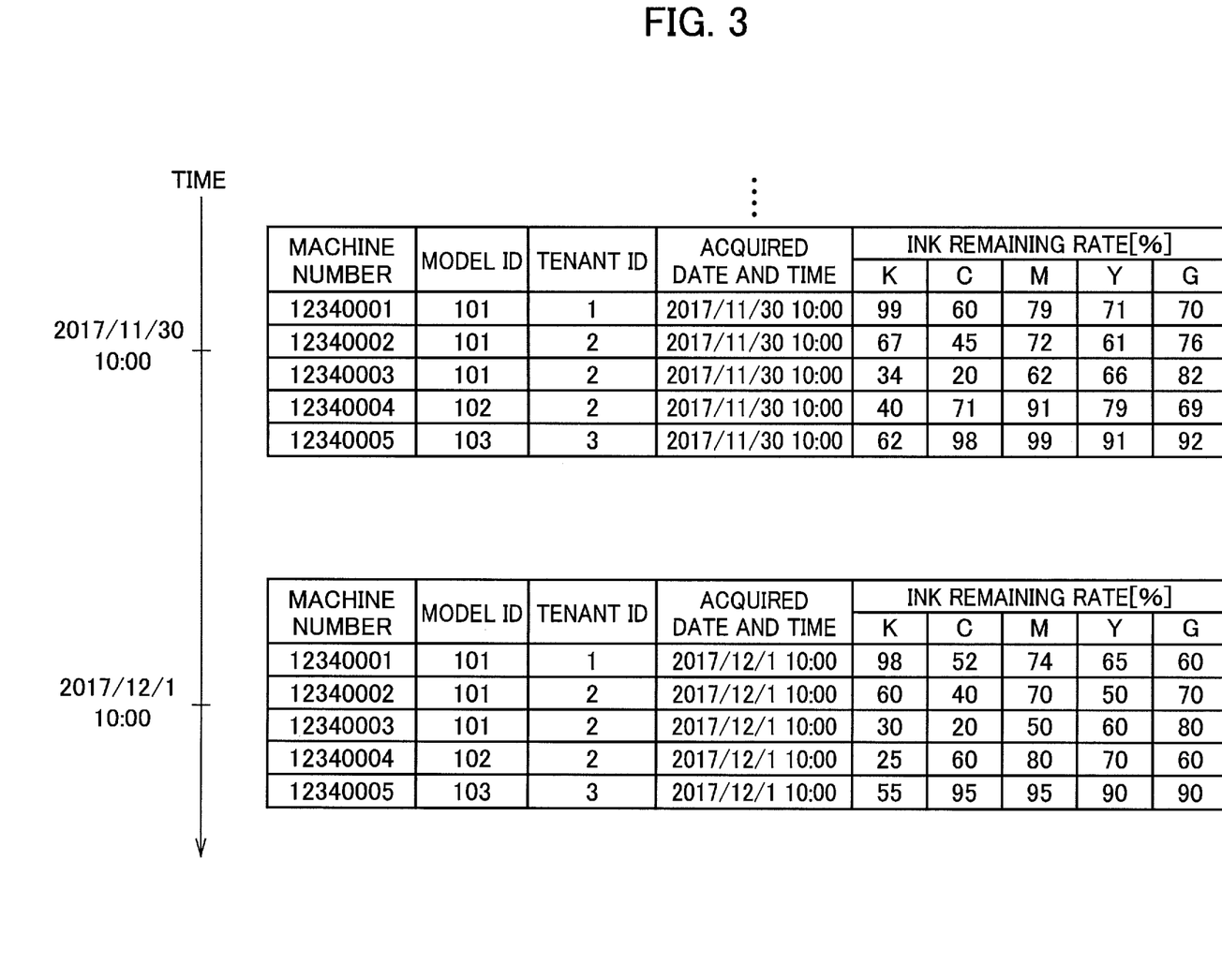
FIG. 3 is a diagram illustrating an example of consumables information.

Accordingly, the management server 1 can collect the ink remaining rate of each color ink in the respective printing devices 2. FIG. 3 is a diagram illustrating consumables information collected regularly. A machine number is a number for identifying the machine body of the printing device 2. A model ID is an ID for identifying the model of the printing device 2. A tenant ID is an ID for identifying a user who uses the printing device 2. An acquired date and time is a received date and time of the consumables information. An ink remaining rate is an ink remaining percentage of each color ink in the printing device 2. K indicates black, C indicates cyan, M indicates magenta, Y indicates yellow, and G indicates gray.

Figure 4:
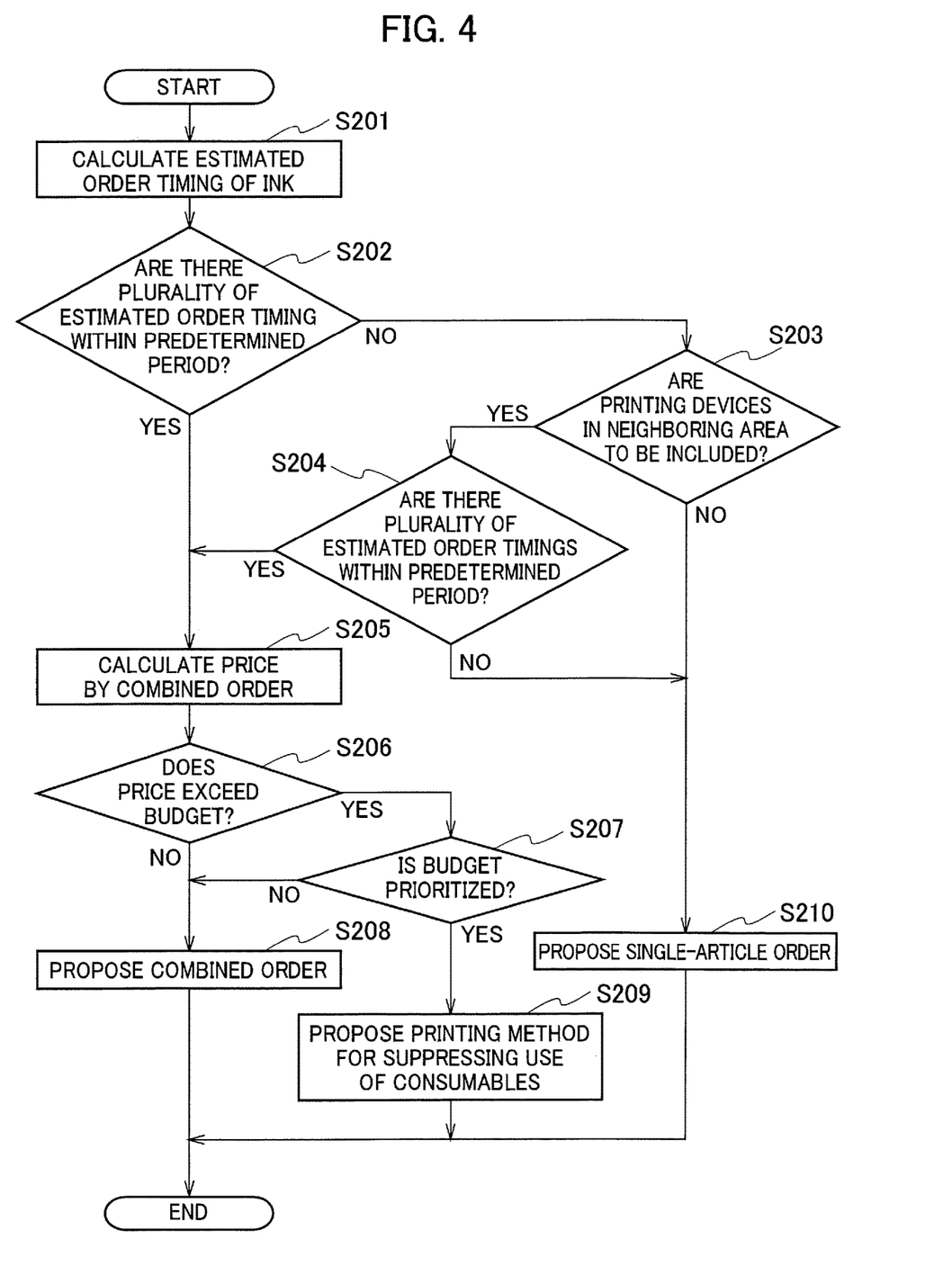
FIG. 4 is a diagram illustrating a process flow of proposing an ordering method.

Next, operations for proposing a combined order of ink are described. FIG. 4 is a diagram illustrating a process flow of proposing a combined ordering method of ink. It is assumed that the management server 1 has already received an annual budget amount associated with ink for each of the printing devices 2.

Step S201;

First, the order-timing estimating unit 13 reads out consumables information of each of the printing devices 2 from the consumables-history management unit 12 to analyze the temporal variation in the ink remaining rate of each color ink, and calculates an estimated order timing at which each color ink is to be ordered. For example, the order-timing estimating unit 13 generates a two-dimensional function graph in which a time is plotted on an x-axis and an ink remaining rate is plotted on a y-axis. The order-timing estimating unit 13 plots the ink remaining rate with respect to the reception time of consumables information to obtain a regression line by using a least-square method and calculates the estimated order timing based on values of x at which y=0 is established. In order to increase the accuracy of the estimated order timing, it is possible that the order-timing estimating unit 13 multiplies a variable (x) of the regression line associated with ink of a specific color (ink of black K or the like), whose ink consumption rate is high, by a coefficient such as 1.1 times. With this process, the order-timing estimating unit 13 can calculate the estimated order timing of each color ink. The estimated order timing of each color ink in the printing devices 2 is exemplified in FIG. 5.

Step S202;

Next, the consumables-order planning unit 14 acquires the estimated order timing of each color ink in the printing devices 2 from the order-timing estimating unit 13, and determines whether there are a plurality of estimated order timings within a predetermined period for each of the printing devices 2. The predetermined period is an arbitrarily set value set by a manager of the management server 1, and the predetermined period can be set in a unit of day, week, month, or year, for example. If there are a plurality of estimated order timings within the predetermined period, the process proceeds to Step S205, and if there are no plural estimated order timings within the predetermined period, the process proceeds to Step S203.

Step S203;

Next, if there are no plural estimated order timings within the predetermined period for each of the printing devices 2, the consumables-order planning unit 14 causes a manager of the management server 1 to select whether to include the printing devices 2 included in a certain neighboring area. If the printing devices 2 included in the certain neighboring area are to be included, the process proceeds to Step S204, and if the printing devices 2 included in the certain neighboring area are not to be included, the process proceeds to Step S210.

Step S204;

Next, if the printing devices 2 included in a certain neighboring area are to be included, the consumables-order planning unit 14 determines whether there are a plurality of estimated order timings within a predetermined period for a plurality of printing devices 2 included in the certain neighboring area. Whether the printing devices 2 are to be included in the certain neighboring area is determined based on whether tenant IDs are the same or whether installation places of the printing devices 2 are the same. If there are plural estimated order timings within the predetermined period, the process proceeds to Step S205, and if there are no plural estimated order timings within the predetermined period, the process proceeds to Step S210.

Step S205;

If there are a plurality of estimated order timings within the predetermined period for each of the printing devices 2 (YES at Step S202), or there are a plurality of estimated order timings within the predetermined period for the printing devices 2 included in a certain neighboring area (YES at Step S204), the consumables-order planning unit 14 makes discount according to the quantity of ink associated with the estimated order timings, and calculates the price of a combined order having been changed corresponding to the delivery statuses of the consumables.

A specific example of the processes described above is explained. For example, if the quantity of ink estimated to be ordered within a predetermined period for a printing device in a development department is plural, the consumables-order planning unit 14 directly advances the process from Step S202 to Step S205 to calculate the price of a combined order for the plurality of elements of ink. On the other hand, if the quantity of ink is only one, the consumables-order planning unit 14 advances the process from Step S202 to Step S203 and then Step S204, and if there is any ink estimated to be ordered within the same predetermined period for printing devices used in another department, this ink is also to be ordered in a combined order. If there are estimated order timings of plural elements of ink within a predetermined period, the consumables-order planning unit 14 can calculate the price of the combined order regardless of users.

A discounting method according to the quantity of ink to be performed at Step S205 is described here. For example, when "December 2017" is input as a predetermined period with respect to the estimated order timing illustrated in FIG. 5, and if all the printing devices 2 with the same tenant ID are to be included, cyan ink C with a machine number "12340003" and black ink K with a machine number "12340004" fall within the predetermined period. Therefore, the consumables-order planning unit 14 calculates the price of a combined order to which, for example, 5% discount is applied with respect to a bulk order of these two elements of ink.

Figure 5:
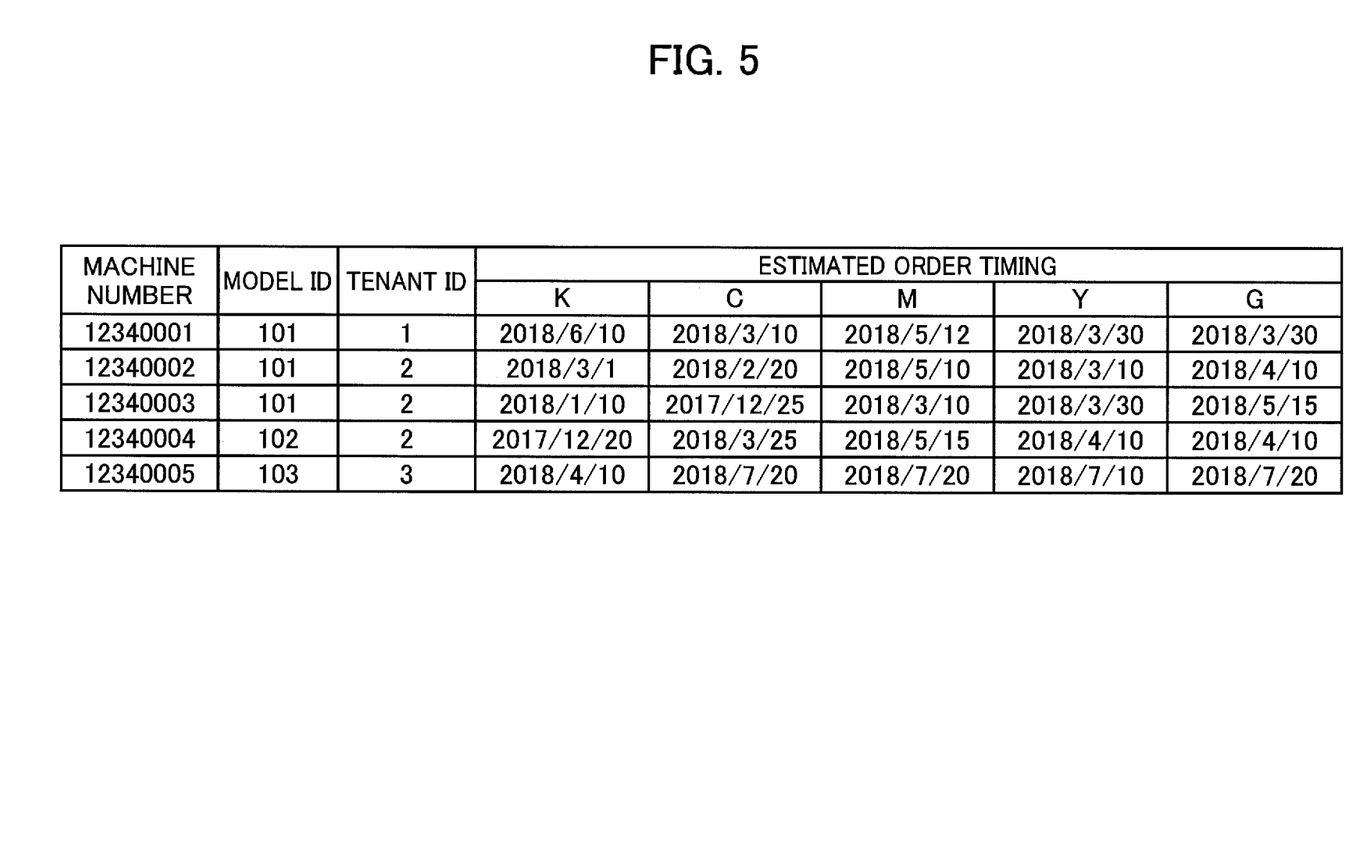
FIG. 5 is a diagram illustrating an example of an estimated order timing of each color ink in a plurality of printing devices.

Further, when the predetermined period is "December 2017 to January 2018", black ink K with a machine number "12340003" also falls within the predetermined period. Therefore, the consumables-order planning unit 14 calculates the price of a combined order to which, for example, 10% discount is applied with respect to a bulk order of these three elements of ink.

Meanwhile, it is possible that the consumables-order planning unit 14 obtains an ordering cycle of ink based on past ink order records, performs fine adjustment for the estimated order timing obtained at Step S201 by using the ordering cycle, and applies a discount rate to minimum to maximum ink quantity ranges based on a reliably combined quantity of ink by using the finely adjusted estimated order timing.

Subsequently, a discount-rate increasing and decreasing method corresponding to the delivery statuses of consumables performed at Step S205 is described. The delivery statuses of consumables are, for example, a delivery route of consumables from a consumables supply source to a printing device, a delivery distance, the number of deliveries, delivery means, a delivery route of a delivery company, an installation place of the printing device 2, and the like. The delivery statuses may include whether there is a sales company (an agent) as an intermediary, whether the order timing is the same as a maintenance timing, or the like. The consumables-order planning unit 14 adjusts the discount rate based on a difference in the delivery statuses.

For example, when many consumables can be delivered in one delivery, or when the delivery timing is the same as the maintenance timing of the printing device 2, the consumables-order planning unit 14 increases the discount rate. Even when users are different, if a plurality of users are geographically close to each other and plural elements of ink to be proposed can be delivered within the same predetermined period as the ink ordered by other users, the consumables-order planning unit 14 increases the discount rate because the delivery cost can be reduced due to joint delivery. Further, if the delivery timing is the same as the maintenance timing of the printing device 2, the delivery cost can be reduced due to carry-in by a maintenance agency, and thus the consumables-order planning unit 14 increases the discount rate.

Meanwhile, the consumables-order planning unit 14 may increase the discount rate when the delivery destinations of plural elements of ink are the same, and may decrease the discount rate when the delivery destinations are different while taking the neighboring area into consideration. A manager of the management server 1 can arbitrarily set whether to increase the discount rate with respect to the specifics of the delivery statuses, and even if the delivery destinations are different, if it is desired to prioritize an order of a user, the manager of the management server 1 may increase the discount rate. Further, the consumables-order planning unit 14 may change the discount rate according to whether plural elements of ink can be delivered in one delivery route, whether the delivery route is the same as a route with the minimum cost generally used by the delivery company, or whether the warehouse storing plural elements of ink therein is the same.

Step S206;

The consumables-order planning unit 14 temporarily adds the price of the combined order calculated at Step S205 to a cumulative amount of order within a fiscal year of a user, and determines whether the cumulative amount of order after the temporary addition exceeds an annual budget amount of the user. The annual budget amount of the user may be a value that the manager of the management server 1 has been notified from a user, or may be a value acquired by analyses performed based on past actual order results of the user. If the cumulative amount of order exceeds the annual budget amount, the process proceeds to Step S207, and if the cumulative amount of order does not exceed the annual budget amount, the process proceeds to Step S208.

Step S207;

Next, if the cumulative amount of order after the temporary addition exceeds the annual budget amount of the user, the consumables-order planning unit 14 causes the user to select whether to prioritize the budget by suppressing the order within the budget, or to prioritize the order by placing it even if exceeding the budget amount. If the user selects to prioritize the budget, the process proceeds to Step S209, and if the user selects to prioritize the order, the process proceeds to Step S208.

Step S208;

Next, if the cumulative amount of order after the temporary addition does not exceed the annual budget amount of the user (NO at Step S206), or if the user selects to prioritize the order (NO at Step S207), the consumables-order planning unit 14 transmits order proposal information for proposing the price of the combined order calculated at Step S205 as an applicable price within a predetermined period to a user terminal or the printing device 2.

For example, the consumables-order planning unit 14 displays, on a monitor of the user terminal or an operation panel of the printing device 2, a message that "two elements of ink of cyan C set in the printing device of "12340003" and black K set in the printing device of "12340004" may become empty by the end of December 2017. If these two elements of ink are placed in a combined order by the end of December 2017, 5% quantity discount is applied thereto and the total amount ¥ XXX becomes ¥ YYY. Further, by suppressing the delivery cost due to simultaneous delivery with the orders of other users in your neighboring area, 2% delivery discount is further applied thereto, and the total amount becomes ¥ ZZZ. If it is ordered after January 2018, only the 5% quantity discount will apply.". Thereafter, the management server 1 ends the process.

Step S209;

On the other hand, if the user selects to prioritize the budget (YES at Step S207), the consumables-order planning unit 14 displays a printing method for suppressing the use of ink on a monitor of the user terminal or an operation panel of the printing device 2. For example, the consumables-order planning unit 14 transmits printing method information indicating printing by diluting concentration, aggregated printing, reduced printing, or printing in blue with cyan C. The consumables-order planning unit 14 may identify and notify the color to be suppressed by referring to the ink remaining rate of the printing device 2 that is managed by the consumables-history management unit 12. Thereafter, the management server 1 ends the process.

Step S210;

If the printing devices 2 in a certain neighboring area are not to be included (NO at Step S203), or if there is no plural estimated order timings within a predetermined period for the plurality of printing devices 2 included in a certain neighboring area (NO at Step S204), as for the printing device 2 having one estimated order timing within the predetermined period, the consumables-order planning unit 14 transmits order proposal information for proposing to order the ink alone, including the price to the user terminal or the printing device 2. Because it is a single-article order, the consumables-order planning unit 14 does not apply any discount.

For example, the consumables-order planning unit 14 displays, on the monitor of the user terminal or the operation panel of the printing device 2, a message that "ink of cyan C set in the printing device of "12340003" may become empty on 25th December 2017. It is recommended to order the ink in December 2017.". Thereafter, the management server 1 ends the process.

Effects

According to the present embodiment, if there are a plurality of estimated order timings within a predetermined period for one printing device 2, or there are a plurality of estimated order timings within a predetermined period for a plurality of printing devices 2 included in a certain neighboring area, the management server 1 makes discount corresponding to the quantity of ink associated with the estimated order timings, and calculates the price of a combined order having been changed according to the delivery status of the ink. Accordingly, the seller can reduce the logistic cost, and users can sufficiently acquire the cost reduction effect associated with ink.

The management server 1 outputs the price of a combined order as an applicable price within a predetermined period, which stimulates the purchasing interest of users and the sellers can favorably improve the sales of ink.

If the price of a combined order exceeds the budget amount of ink, the management server 1 causes a user to select budget priority for prioritizing the budget or order priority for prioritizing the order of consumables. Therefore, the user can place an order selectively according to the budget amount of ink, thereby enabling to prevent a possibility of placing an order exceeding the budget amount of ink.

If budget priority is selected, the management server 1 outputs printing method information indicating a printing method that can suppress the use of consumables. Accordingly, a printing method that matches user requirements with respect to consumption of ink can be proposed.

First Modification

At Step S102, the printing device 2 transmits, to the management server 1, consumables information added with date and time information at the time of transmission. At Step S201, the management server 1 can respectively analyze temporal variation in an ink remaining rate by using the date and time information at the time of transmission that is added to the consumables information. With this process, for example, even if malfunctions in communication occur in the communication network 3 and the order of notification of the consumables information with respect to the management server 1 is changed, the management server 1 can rearrange the pieces of consumables information along the consumed time of consumables, and can accurately calculate estimated order timings thereafter.

Second Modification

The order-timing estimating unit 13 of the management server 1 can extract, for example, two points of a plurality of plot points to estimate the estimated order timing by using a straight line passing the two points, instead of using a regression analysis method of the least-square method used at Step S201. With this process, although there is a possibility of decreasing the accuracy of the estimated order timing, the calculation cost of the estimated order timing can be reduced. The order-timing estimating unit 13 can calculate the estimated order timing by using other calculation methods.

Third Modification

The printing system can use printing paper as consumables. A plurality of printing devices 2 respectively notify the management server 1 of the remaining number of sheets of printing paper of each size such as A4. The management server 1 manages the remaining number of sheets of printing paper of each size in the printing devices 2 respectively in chronological order. The management server 1 can propose a combined order also for printing paper by performing operations identical to those in the case of ink.

Fourth Modification

The printing system may use forming members of a printing mechanism as consumables. For example, the forming members are a plurality of printing heads that respectively discharge respective elements of color ink and a plurality of wipers that respectively clean nozzle surfaces of a plurality of printing heads. For example, while printing heads do not have a high replacement frequency as those of ink and printing paper, if ink in a certain amount or more is discharged, blockage of ink occurs in the printing heads and replacement is required in a long-term cycle. In this case, the management server 1 can propose a combined order also for the printing heads, by regarding a cumulative value of the ink discharge amount as a used amount of the printing heads ink remaining rate).

Fifth Modification

The printing system may include different types of consumables as a target of a combined order. For example, the management server 1 may manage the usage statuses of all elements of ink, printing paper, printing heads, and wipers so as to calculate an estimated order timing. With this process, because the quantity of consumables having an estimated order timing within a predetermined period increases, the price of the combined order can be further reduced.

Others

The present invention is not limited exactly to the above embodiment, and when the invention is actually implemented, it may be embodied in other specific forms while modifying the constituent elements without departing from the spirit of the invention. In addition, various inventions may be formed by appropriate combinations of a plurality of constituent elements disclosed in the above embodiment. For example, several constituent elements may be omitted from all the constituent elements described in the above embodiment.

Further, for example, respective functions and processes described above may be implemented on one or more processing circuits. The processing circuits include programmed processors, electric circuits, and the like, and also include devices such as application specific integrated circuits (ASIC) and circuit constituent elements that are arranged to execute the functions described above.

That is, the management server 1 described in the present embodiment can be realized by a computer including a memory and a CPU. Further, processing performed by the management server 1 can be constructed as a program to be installed on a computer and be executed, and further be distributed through the communication network 3. The printing device 2 is an example of an image forming device that forms an image of printing-object data. An enclosing and sealing device or the like accompanying the printing device 2 can also be included in an object device.

This application claims priority based on Japanese Patent Application No. 2018-048987 filed on Mar. 16, 2018, and the entire content of this application is incorporated herein by reference.

REFERENCE SIGNS LIST 1 management server
11 printing-device management unit
12 consumables-history management unit
13 order-timing estimating unit
14 consumables-order planning unit
15 consumables-budget reception unit
2 printing device
21 discharge-amount recording unit
22 ink-circulation control unit
23 system control unit
24 network control unit
201 engine unit
202 printing management unit
3 communication network

What is claimed is:

1. A system comprising:
one or more printers configured to perform printing, including
   a plurality of consumables consumed during printing by the one or more printers, and
   a network controller configured to transmit usage statuses of each of the plurality of consumables used by the one or more printers during printing, and
a management server including
a transmission and reception unit that communicates with the one or more printers; and
a controller, wherein the controller
   receives consumables information indicating the usage statuses of each of the plurality of consumables being used by one of the printers via the transmission and reception unit transmitted from the network controller of the one printer,
   calculates an estimated order timing at which each of the consumables is to be ordered, based on a temporal variation in the respective usage statuses of the consumables, and
   when there are a plurality of estimated order timings within a predetermined period for the one printer, or when there are a plurality of estimated order timings within a predetermined period for the plurality of printers included in a certain neighboring area, changes and outputs a price of consumables associated with the estimated order timings corresponding to delivery statuses of the consumables, and
wherein the delivery statuses include at least one of a delivery route of consumables from a consumables supply source to the one or more printers, a delivery distance, a number of deliveries, delivery means, a delivery route of a delivery company, an installation place of the one or more printers, whether there is a sales company as an intermediary, or whether an order timing is the same as a maintenance timing,
wherein the controller further
   receives an annual budget amount associated with the consumables,
   determines whether the changed price exceeds the received annual budget amount,
   when determining that the changed price exceeds the received annual budget causes a user of the printers to select one of budget priority for prioritizing a budget or order priority for prioritizing an order of consumables, and
   when the budget priority is selected, outputs printing method information indicating a printing method capable of suppressing use of consumables by the printers.

2. A system comprising:
one or more printers configured to perform printing, including
   a plurality of consumables consumed during printing by the one or more printers, and
   a network controller configured to transmit usage statuses of each of the plurality of consumables used by the one or more printers during printing, and
a management server including
a transmission and reception unit that communicates with the one or more printers; and
a controller, wherein the controller
   receives consumables information indicating the usage statuses of each of the plurality of consumables being used by one of the printers via the transmission and reception unit transmitted from the network controller of the one printer,
   calculates an estimated order timing at which each of the consumables is to be ordered, based on a temporal variation in the respective usage statuses of the consumables, and
   when there are a plurality of estimated order timings within a predetermined period for the one printer, or when there are a plurality of estimated order timings within a predetermined period for the plurality of printers included in a certain neighboring area, changes and outputs a price of consumables associated with the estimated order timings corresponding to delivery statuses of the consumables, and
wherein the delivery statuses include at least one of a delivery route of consumables from a consumables supply source to the one or more printers, a delivery distance, a number of deliveries, delivery means, a delivery route of a delivery company, an installation place of the one or more printers, whether there is a sales company as an intermediary, or whether an order timing is the same as a maintenance timing,
wherein the controller
   determines an estimated time at which each consumable will be depleted, based on a temporal variation in the respective usage statuses of the consumables transmitted from the one or more printers and received by the transmission and reception unit, and
   wherein when the estimated times at which at least two consumables will be depleted are within the predetermined period for the printer, or when the estimated times at which the at least two consumables used in the plurality of printers in the certain neighboring area will be depleted are within the predetermined period, the controller changes the price of the at least two consumables and controls the transmission and reception unit to output the changed price to a user terminal or at least one printer.

3. The system according to claim 2, wherein
the controller changes the price of the at least two consumables and controls the transmission and reception unit to output the changed price to the user terminal or the at least one printer
   if the changed price does not exceed a predetermined price, and
   when the estimated times at which the at least two consumables will be depleted are within the predetermined period for the one printer, or when the estimated times at which at least the two consumables used in the plurality of printers in the certain neighboring area will be depleted are within the predetermined period, and
if the changed price exceeds the predetermined price, the controller controls the transmission and reception unit to transmit to the user terminal or the at least one printer a printing method for suppressing the use of one of the consumables while still permitting printing by the one or more printers.

4. The system according to claim 3, wherein
the consumables information is ink remaining rate information indicating the percentage of remaining ink of each color in each of the one or more printers, the consumables are inks of different colors, and
the transmitted printing method is a method for suppressing the use of the remaining ink transmitted to the user terminal or the at least one printer and includes one of diluting ink concentration, aggregated printing, reduced printing, or printing in blue with cyan.

5. The system according to claim 2,
wherein if it is determined that the estimated times at which the at least two consumables will be depleted in one of the printers are not within the predetermined period, then the controller
   determines whether at least two of the plurality of printers are within the certain neighboring area,
   determines if the estimated times at which two consumables used in the at least two of the plurality of printers in the certain neighboring area will be depleted are within the predetermined period if the at least two of the plurality of printers are within the certain neighboring area, and
   changes the price of the two consumables used in the at least two of the plurality of printers and controls the transmission and reception unit to output the changed price to the user terminal or the at least one printer.

* * * * *